Figure 1:
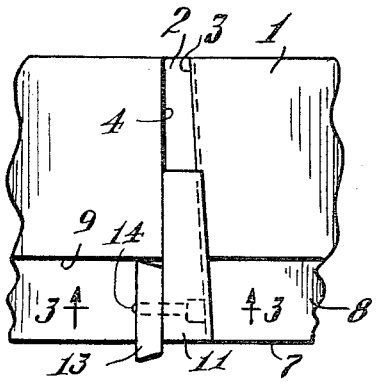

March 21, 1967     T. V. WILLIAMS     3,309,758

CUTTING TOOL

Filed Jan. 13, 1965

INVENTOR.
Thurston V. Williams
BY
Roberts Cushman & Grover
ATT'YS

United States Patent Office 3,309,758
Patented Mar. 21, 1967

3,309,758
CUTTING TOOL
Thurston V. Williams, Wilton, N.H., assignor to The O.K. Tool Company, Inc., Milford, N.H., a corporation of New Hampshire
Filed Jan. 13, 1965, Ser. No. 425,290
12 Claims. (Cl. 29—105)

This invention relates to tools of the type having replaceable bits and more particularly to tools comprising a rotary carrier. Heretofore it has been customary to mount the bits in recesses in the carrier but this practice involves difficulties. One difficulty is to mill the recess accurately so as to position the bit accurately. Also it is difficult to remove the bits from the recesses for sharpening or replacement.

Objects of the present invention are to avoid the aforesaid difficulties, to facilitate accurate cutting of the surfaces which position the bits, and to facilitate the operations of mounting the bits on the carrier and replacing the bits.

According to the present invention the tool comprises a carrier movable in a predetermined direction, the carrier having a recess with a bottom, a mouth opposite the bottom and two sides, one side facing in said direction and the other side facing in the opposite direction, one end of the recess being open, a shelf extending endwise from the carrier at said open end, the shelf being offset from said mouth in the direction of said bottom to provide a shoulder at said end, a polygonal bit having one side seating on said shelf and another side seating on said shoulder, a bit backing mounted in said recess and projecting beyond said end behind said bit, and means to hold the back of the bit against said backing with said sides of the bit seating on the shelf and shoulder as aforesaid. Preferably the aforesaid recess and backing extend into the shelf, the aforesaid holding means comprises a pin extending through a bore in the backing, the pin having a head rotatably mounted in said bore with a shank extending into an opening in the bit, the shank being eccentric to the head so that rotation of the head in the backing presses the aforesaid sides of the bit against the shelf and shoulder and said shank being resilient so that the bit is pressed against the shelf and shoulder yieldingly.

In a more specific aspect the tool comprises a circular carrier rotatable in a predetermined direction about its axis, the carrier having in its periphery a recess with a bottom and two sides, one side facing in the aforesaid direction and the other side facing in the opposite direction, one end of the recess being open, a shelf extending axially of the carrier at the open end, the shelf being offset from the aforesaid periphery toward the axis to provide a shoulder at the open end, a polygonal bit having one side seating on the shelf and another side seating on the shoulder, a bit backing mounted in the recess and projecting axially beyond the open end behind said bit, and means to hold the back of the bit against the backing with the aforesaid sides of the bit seating on the shelf and shoulder.

In the preferred embodiment the shelf and shoulder meet at right angles and the bit is square.

Figure 3:
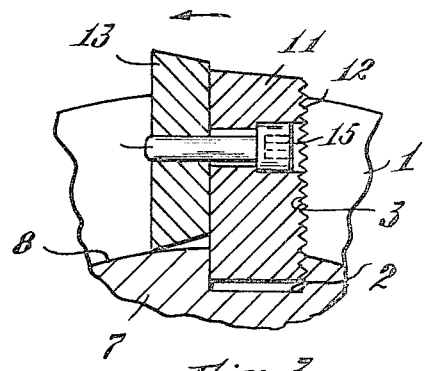
Figure 2:
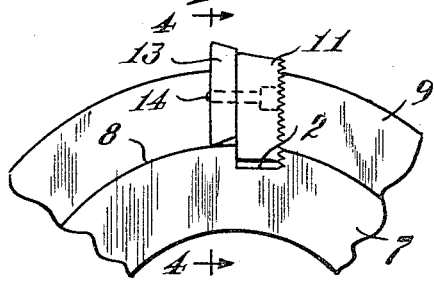
Figure 4:
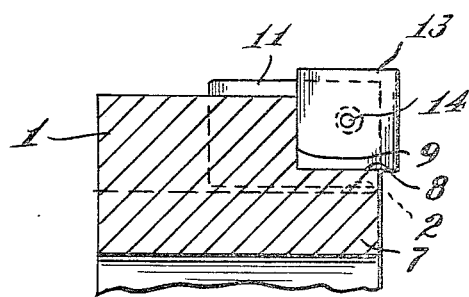
Figure 5:
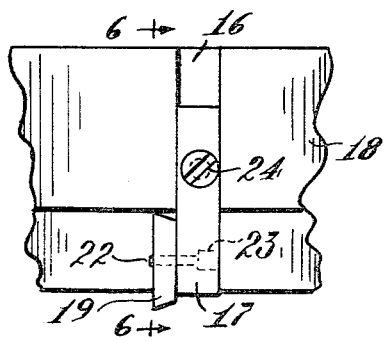
Figure 7:
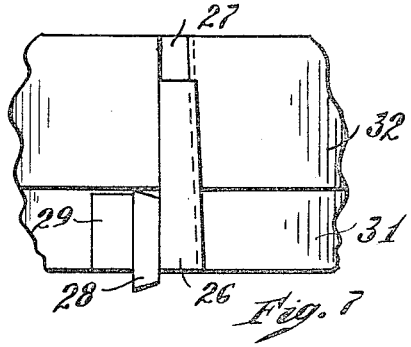
Figure 6:
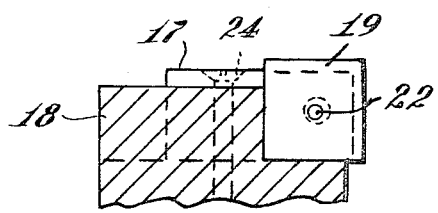

For the purpose of illustration typical embodiments of the invention are shown in the accompanying drawings in which FIG. 1 is a side view of one embodiment;
FIG. 2 is an end view of the same embodiment;
FIG. 3 is a section on line 3—3 of FIG. 1;
FIG. 4 is a section on line 4—4 of FIG. 2;
FIG. 5 is a side view of a modification;
FIG. 6 is a section on line 6—6 of FIG. 5;
FIG. 7 is a side view of another embodiment; and
FIG. 8 is an end view of this embodiment.

The particular embodiment of the invention shown in FIGS. 1 to 4 comprises a rotary carrier 1 having recesses distributed around its periphery, each recess having a bottom 2, a rear side 3 facing in the direction of rotation, a front side 4 facing in the opposite direction, and a mouth opening through the periphery of the carrier, both ends of the recess being open. At one end of the carrier 1 is an extension 7 of smaller diameter, thereby providing a peripheral shelf 8 coaxial with the carrier and a shoulder 9 meeting the shelf at right angles. As shown in FIGS. 2, 3 and 4 the recess 2 also extends into the extension 7. As shown in FIG. 1 the recess 2 is tapered axially of the carrier 1. Mounted in the recess is a bit backing 11 which is tapered the same as the recess and which has serrations 12 interengaging complemental serrations on the rear face 3 of the recess. Disposed in advance of the backing 11 is a bit 13 having a central opening to receive the shank 14 of a pin disposed eccentrically on a head 15 rotatable in a recess in the backing 11. By rotating the eccentric pin 14–15 the bit 13 is forced against the shelf 8 and shoulder 9 of the carrier and by applying sufficient force to the head 15 the eccentric shank 14 is flexed yieldingly to hold the bit against the shelf and shoulder.

The modification shown in FIGS. 5 and 6 differs from that shown in FIGS. 1 to 4 in that the recess 16 is not tapered and the bit backing 17 does not have serrations intermeshing with serrations on the carrier 18. As in FIGS. 1 to 4 the bit 19 is held on the carrier 21 by means of an eccentric pin 22–23. The backing 17 is held in the recess 16 by means of a screw 24 extending through the backing and threading into the bottom of the recess.

Figure 8:
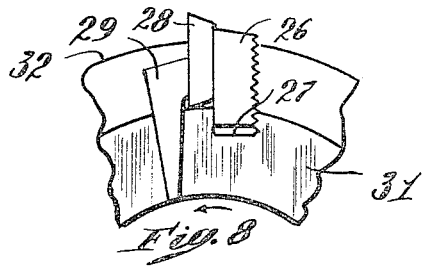

The modification shown in FIGS. 7 and 8 is like that shown in FIGS. 1 to 4 in that it comprises a bit backing 26 mounted in a recess 27. A bit 28 is held against the forward face of the backing 26 by means of a wedge 29 which is tapered to fit in a tapered recess in the extension 31 of the carrier 32.

From the foregoing it will be evident that the shelf and shoulder which position the bit can be formed easily and accurately because they are exterior surfaces instead of interior surfaces in a recess. It will also be evident that the bit may be replaced quickly and easily. Indeed in the first two embodiments it is necessary only to give the eccentric pin a part turn.

It should be understood that the present disclosure is for the purpose of illustration only and that this invention includes all modifications and equivalents which fall within the scope of the appended claims.

I claim:

1. A cutting tool comprising a carrier movable in a predetermined direction, the carrier having a recess with a bottom, a mouth opposite the bottom and two sides, one side facing in said direction and the other side facing in the opposite direction, one end of the recess being open, a shelf extending endwise from the carrier at said open end, the shelf being offset from said mouth in the direction of said bottom to provide a shoulder at said end, a polygonal bit having one side seating on said shelf and another side seating on said shoulder, a bit backing mounted in said recess and projecting beyond said end behind said bit, and means to hold the back of the bit against said backing with said sides of the bit seating on the shelf and shoulder as aforesaid.

2. A cutting tool according to claim 1 wherein said recess and backing extend into said shelf.

3. A cutting tool according to claim 1 wherein said holding means comprises a pin extending through a bore in said backing, the pin having a head rotatably mounted in said bore with a shank extending into an opening in the bit, said shank being eccentric to said head so that rotation of the head in the backing presses said sides of the bit against said shelf and shoulder.

4. A cutting tool according to claim 3 wherein said shank is resilient so that the bit is pressed against the shelf and shoulder yieldingly.

5. A cutting tool according to claim 1 wherein said holding means comprises a wedge fitting in a recess in said shelf with its outer end bearing on the front of the bit.

6. A cutting tool according to claim 1 wherein the shelf and shoulder meet at right angles and the bit is square.

7. A cutting tool comprising a circular carrier rotatable in a predetermined direction about its axis, the carrier having in its periphery a recess with a bottom and two sides, one side facing in said direction and the other side facing in the opposite direction, one end of the recess being open, a shelf extending axially of the carrier at said open end, the shelf being offset from said periphery toward said axis to provide a shoulder at said end, a polygonal bit having one side seating on said shelf and another side seating on said shoulder, a bit backing mounted in said recess and projecting axially beyond said end behind said bit, and means to hold the back of the bit against said backing with said sides of the bit seating on the shelf and shoulder as aforesaid.

8. A cutting tool according to claim 6 wherein said recess and backing extend into said shelf.

9. A cutting tool according to claim 6 wherein said holding means comprises a pin extending through a bore in said backing, the pin having a head rotatably mounted in said bore with a shank extending into an opening in the bit, said shank being eccentric to said head so that rotation of the head in the backing presses said sides of the bit against said shelf and shoulder.

10. A cutting tool according to claim 8 wherein said shank is resilient so that the bit is pressed against the shelf and shoulder yieldingly.

11. A cutting tool according to claim 6 wherein said holding means comprises a wedge fitting in a recess in said shelf with its outer end bearing on the front of the bit.

12. A cutting tool according to claim 7 wherein the shelf and shoulder meet at right angles and the bit is square.

No references cited.

WILLIAM W. DYER, JR., *Primary Examiner.*

H. L. HINSON, *Assistant Examiner.*